United States Patent
Satoh

(10) Patent No.: US 8,130,336 B2
(45) Date of Patent: Mar. 6, 2012

(54) BACKLIGHT APPARATUS, DISPLAY APPARATUS AND TELEVISION RECEIVER

(75) Inventor: Tamotsu Satoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 213 days.

(21) Appl. No.: 12/600,523

(22) PCT Filed: Jan. 24, 2008

(86) PCT No.: PCT/JP2008/050953
§ 371 (c)(1),
(2), (4) Date: Nov. 17, 2009

(87) PCT Pub. No.: WO2008/152824
PCT Pub. Date: Dec. 18, 2008

(65) Prior Publication Data
US 2010/0149429 A1      Jun. 17, 2010

(30) Foreign Application Priority Data
Jun. 11, 2007   (JP) ................................ 2007-153505

(51) Int. Cl.
*G02F 1/1333* (2006.01)
(52) U.S. Cl. .......... 349/58; 362/97.2; 362/225; 362/634
(58) Field of Classification Search .................. 362/634, 362/225, 217.12, 217.16
See application file for complete search history.

(56) References Cited

U.S. PATENT DOCUMENTS

| | | |
|---|---|---|
| 2007/0064169 A1 | 3/2007 | Miyazono |
| 2007/0183149 A1* | 8/2007 | Ko et al. ........................ 362/225 |
| 2007/0230169 A1 | 10/2007 | Kwon et al. |
| 2008/0024068 A1 | 1/2008 | Cho et al. |

FOREIGN PATENT DOCUMENTS

| | | |
|---|---|---|
| JP | 60-009178 U | 1/1985 |
| JP | 05-290933 A | 11/1993 |
| JP | 2004-294592 A | 10/2004 |
| JP | 2007-095671 A | 4/2007 |
| JP | 2007-280955 A | 10/2007 |
| JP | 2008-034386 A | 2/2008 |

OTHER PUBLICATIONS

Official Communication issued in International Patent Application No. PCT/JP2008/050953, mailed on Mar. 25, 2008.

* cited by examiner

*Primary Examiner* — Richard Kim
(74) *Attorney, Agent, or Firm* — Keating & Bennett, LLP

(57) ABSTRACT

A backlight apparatus can avoid a situation where a light source cannot be turned on and includes a light source having a base portion, a connector member including a contact portion having a recessed shape and electrically connected to the base portion of the light source, and a contact correcting portion arranged to contact with the contact portion of the connector member, wherein the light source is arranged inside a recessed portion, having the recessed shape, of the contact portion, and the contact correcting portion is arranged to press the contact portion of the connector member toward the base portion of the light source so as to close the recessed portion on a side of open ends of the contact portion.

6 Claims, 15 Drawing Sheets

BACKLIGHT APPARATUS, DISPLAY APPARATUS AND TELEVISION RECEIVER

BACKGROUND OF THE INVENTION

1. Field of the Invention

The present invention relates to a backlight apparatus, a display apparatus, and a television receiver, and more particularly, the present invention relates to a backlight apparatus, a display apparatus, and a television receiver, each equipped with a connector member electrically connected to a terminal of a light source.

2. Description of the Related Art

Conventionally, a backlight apparatus provided with a connector member electrically connected to a terminal of a light source has been known (e.g., see JP-A-2004-294592). JP-A-2004-294592 discloses a backlight unit provided with a fluorescent lamp (light source) having an input terminal thereof, and a lamp connecting member (connector member) electrically connected to the input terminal of the fluorescent lamp. The lamp connecting member includes a pair of lamp holding portions (side surface portions) pinching the input terminal of the fluorescent lamp from the right and the left, and an electrode portion (coupling portion) thereof coupling the pair of lamp holding portions. With the backlight unit disclosed by JP-A-2004-294592, when the fluorescent lamp is fitted to the connecting member, the input terminal of the fluorescent lamp is inserted between the pair of lamp holding portions from the side of open ends of the pair of lamp holding portions (side opposite to the electrode portion) so as to be sandwiched therebetween.

With the above-described backlight unit disclosed by JP-A-2004-294592, however, when the fluorescent lamp is fitted to the lamp connecting member, the input terminal of the fluorescent lamp may be pressed against the pair of lamp holding portions with an excessive force, or an operator may press the lamp holding portions with his or her finger. In such a case, the lamp holding portions may remain in an outwardly opened state (open to both sides thereof) as a result of plasticity deformation, and thus the input terminal of the fluorescent lamp and the lamp holding portions of the lamp connecting member may be inconveniently in a state of having no contact with each other. Consequently, a problem arises in that the fluorescent lamp may not be turned on. In addition, if the input terminal of the fluorescent lamp and the lamp holding portions of the lamp connecting member fails to have contact with each other, electrical discharge in air will be caused between the input terminal of the fluorescent lamp and the lamp holding portions of the connecting member. Also in this case, a problem arises that the input terminal of the fluorescent lamp is oxidized, and eventually cannot be turned on.

SUMMARY OF THE INVENTION

In order to solve the above-described problems, preferred embodiments of the present invention provide a backlight apparatus, a display apparatus, and a television receiver that can avoid a situation where a light source cannot be turned on.

A backlight apparatus according to a first preferred embodiment of the present invention includes a light source including a terminal, a connector member including a contact portion thereof having a recessed shape and electrically connected to the terminal of the light source, and a contact correcting member arranged to make contact with the contact portion of the connector member, wherein the light source is arranged inside a recessed portion, having the recessed shape, of the contact member, and the contact correcting member is arranged to press the contact portion of the connector member toward the terminal of the light source so as to close the recessed portion, on a side of the open ends, of the contact portion.

With the backlight apparatus according to the first preferred embodiment of the present invention, as described above, the contact correcting member is arranged to make contact with the contact portion of the connector member, and the contact correcting member is configured so as to press the contact portion of the connector member toward the terminal of the light source so as to close the recessed portion, on the side of the open ends, of the contact portion. Thus, even in a case where, when the light source is fitted to the connector member, the terminal of the light source is pressed against the contact portion with an excessive force or an operator presses the contact portion with his or her finger, with the result that the contact portion is plastically deformed and remains opened wide outward accordingly, the contact correcting portion makes it possible to press the contact portion of the connector member toward the terminal of the light source so as to close the recessed portion, on the side of the open ends, of the contact portion. Consequently, it is possible to prevent the terminal of the light source and the contact portion of the connector member from having no contact with each other. Thus, it is possible to avoid a situation where the light source cannot be turned on.

In the backlight apparatus according to the first preferred embodiment of the present invention, preferably, the contact portion has a pair of side surface portions pinching the terminal of the light source, and a coupling portion coupling the pair of side surface portions, and the contact correcting member includes a pair of pressing portions arranged so as to pinch the pair of the side surface portions of the contact portion. With this configuration, it is possible to pinch the pair of side surface portions of the contact portion with the pair of pressing portions of the contact correcting member, making it possible to press the pair of side surface portions of the contact portion toward the terminal of the light source placed inside the recessed portion, having the recessed shape, of the contact portion. Thus, it is possible to easily prevent the terminal of the light source and the contact portion of the connector member from being in a state of having no contact with each other.

In the backlight apparatus, in which the above-described contact portion has a pair of side surface portions thereof and a coupling portion thereof, and the contact correcting member includes a pair of pressing portions, preferably, the contact correcting member is configured such that a position at which the pair of pressing portions make contact with the pair of side surface portions is moved from the side of the coupling portion of the contact portion to the side of the open ends of the contact portion, and that thereby the contact portion of the connector member is pressed toward the terminal of the light source. With this configuration, it is possible to easily press the contact portion of the connector member toward the terminal of the light source by moving the pair of pressing portions from the side of the coupling portion to the side of the open ends of the contact portion. Thus, it is possible to easily prevent the terminal of the light source and the contact portion of the connector member from being in the state of having no contact with each other.

In this case, preferably, each of the pair of pressing portions has a slanting portion thereof slanting in a direction in which the light source extends. With this configuration, by moving the pair of pressing portions in the direction in which the light source extends, it is possible to move the position at which the pair of pressing portions make contact with the pair of side surface portions from the side of the coupling portion of the contact portion toward the side of the open ends of the contact portion.

In the backlight apparatus according to the first preferred embodiment of the present invention, preferably, the contact correcting member is brought into contact with a portion on the side of the open ends of the contact portion relative to a center of the light source. With this configuration, it is possible to easily press the contact portion of the connector member toward the terminal of the light source so as to close the recessed portion on the side of the open ends of the contact portion, with the contact correcting member.

In the backlight apparatus according to the first preferred embodiment of the present invention, preferably, the contact correcting member is preferably elastically deformable, and accordingly urges the contact portion of the connector member toward the terminal of the light source. With this configuration, it is possible to easily press (urge) the contact portion of the connector member toward the terminal of the light source.

A display apparatus according to a second preferred embodiment of the present invention is provided with the backlight apparatus as described above, and a display panel illuminated by the backlight apparatus. With this configuration, it is possible to obtain a display apparatus that can avoid a situation where the light source cannot be turned on.

A television receiver according to a third preferred embodiment of the present invention is provided with the display apparatus as described above, a cabinet accommodating the display apparatus, a tuner, and a loudspeaker. With this configuration, it is possible to obtain a television receiver that can avoid the situation where the light source cannot be turned on.

As described above, according to various preferred embodiments of the present invention, it is possible to easily obtain a backlight apparatus, a display apparatus, and a television receiver that can avoid a situation where a light source cannot be turned on.

Other features, elements, steps, characteristics and advantages of the present invention will become more apparent from the following detailed description of preferred embodiments of the present invention with reference to the attached drawings

DETAILED DESCRIPTION OF THE PREFERRED EMBODIMENTS

Hereinafter, a structure of a liquid crystal display television receiver 1 provided with a backlight apparatus 20 according to a preferred embodiment of the present invention will be described with reference to FIGS. 1 to 13. The liquid crystal display television receiver 1 is an example of a "television receiver" embodying the present invention.

Figure 1:
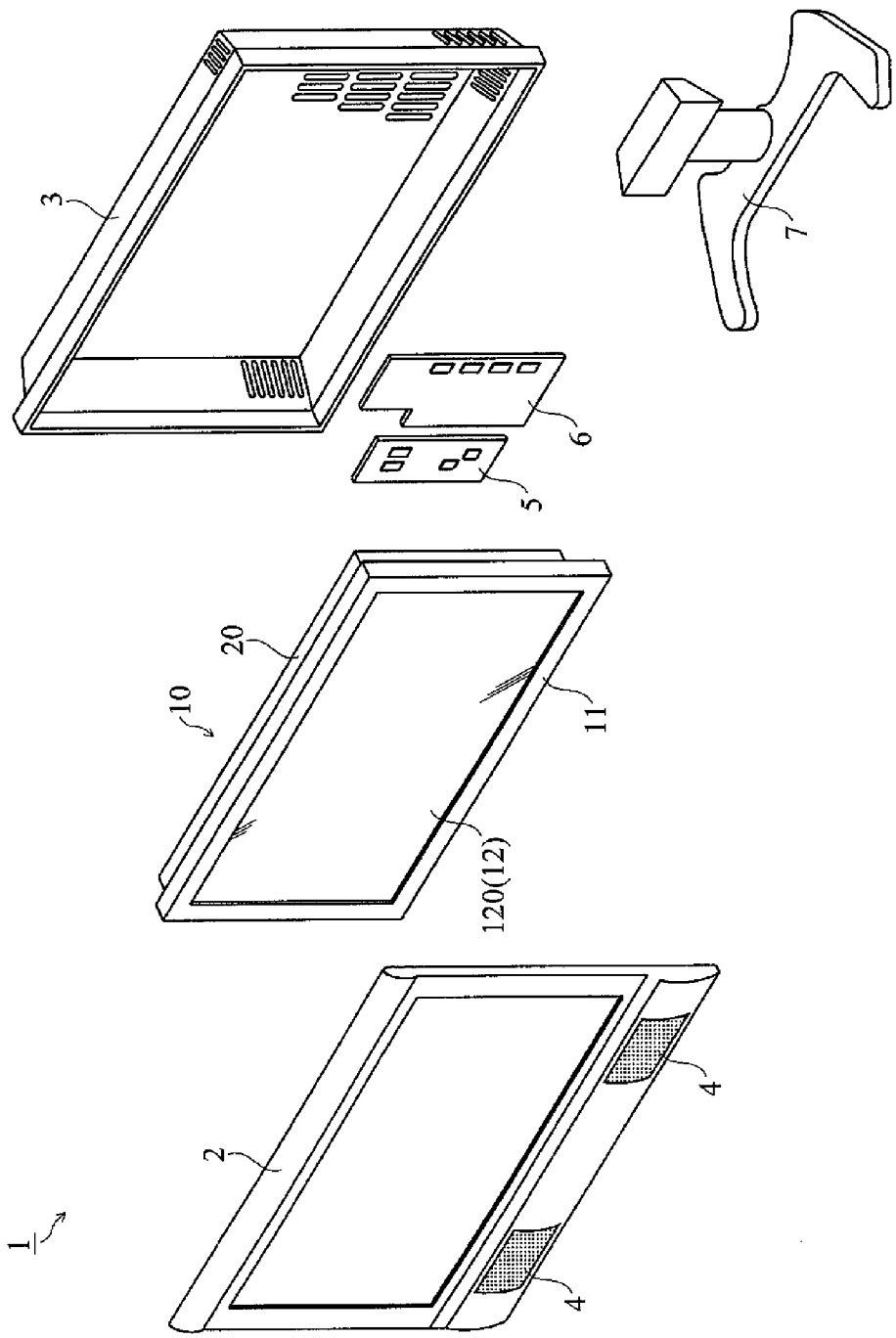
FIG. 1 is an exploded perspective view showing an entire structure of a liquid crystal display television receiver provided with a backlight apparatus according to a preferred embodiment of the present invention.

As shown in FIG. 1, the liquid crystal display television receiver 1 equipped with the backlight apparatus 20 according to a preferred embodiment of the present invention preferably includes a liquid crystal display apparatus 10 including the backlight apparatus 20, a front cabinet 2 and a rear cabinet 3 accommodating the liquid crystal display apparatus 10, loudspeakers 4 mounted on the front cabinet 2, a tuner 5, a power supply 6, and a supporting member 7. For the front cabinet 2, the rear cabinet 3, the loudspeakers 4, the tuner 5, the power supply 6, and the supporting member 7, conventional ones used in general can be adopted; therefore, they will be simply described here. The liquid crystal display apparatus 10 here is an example of a "display apparatus" embodying the present invention, and the front cabinet 2 and the rear cabinet 3 here are an example of a "cabinet" embodying the present invention.

The front cabinet 2 and the rear cabinet 3 accommodate the liquid crystal display apparatus 10, the tuner 5, and the power supply 6, and are supported by the supporting member 7. Moreover, the tuner 5 has a capability of generating an image signal and an audio signal for a predetermined channel from radio waves. The loudspeakers 4 have a capability of producing audio based on the audio signal generated by the tuner 5. The power supply 6 is configured so as to supply power to the liquid crystal display apparatus 10, the loudspeakers 4, and the tuner 5. The loudspeakers 4, the tuner 5, and the power supply 6 may be so configured as to be incorporated in the liquid crystal display apparatus 10.

Figure 2:
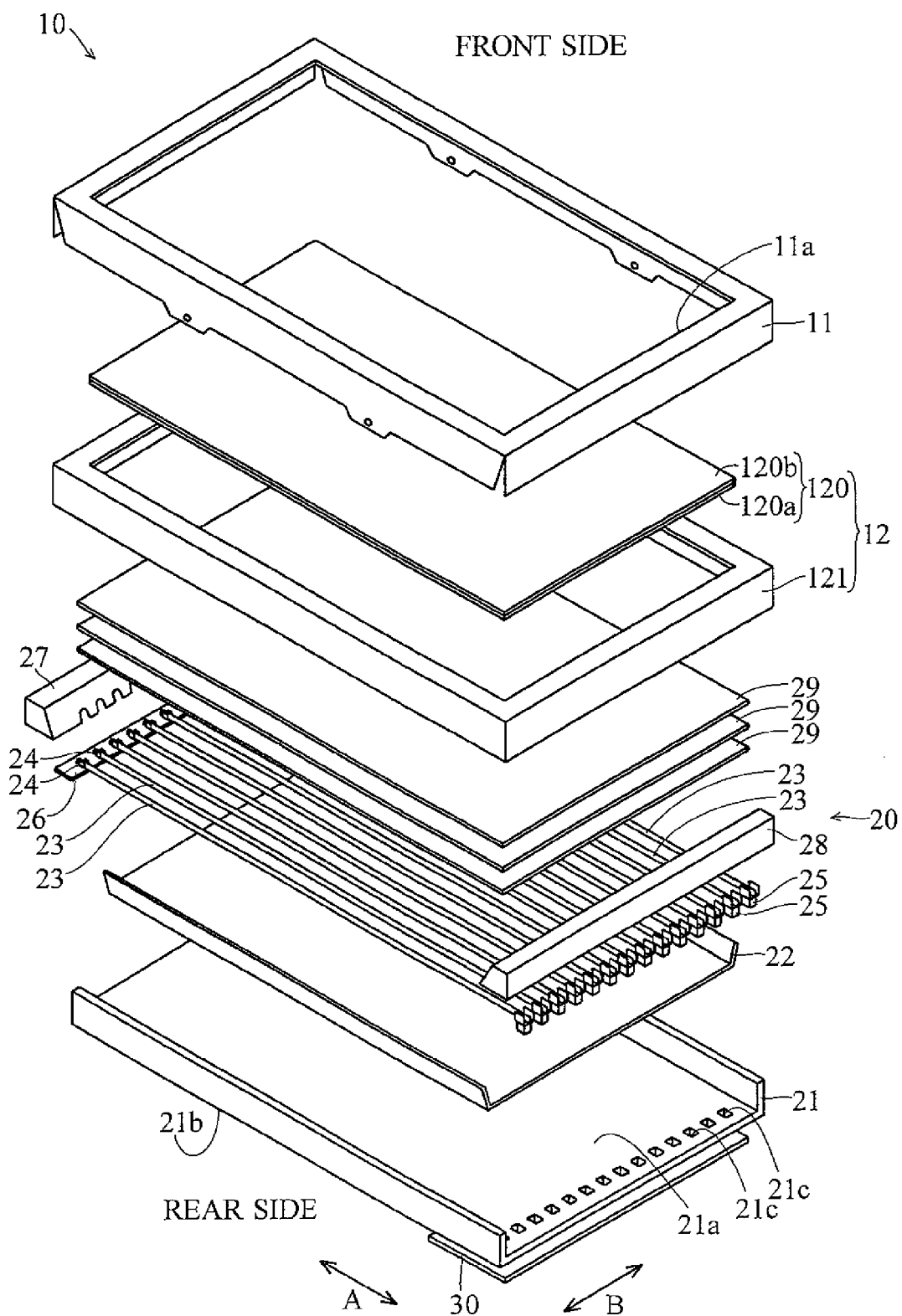
FIG. 2 is an exploded perspective view showing a structure of a liquid crystal display apparatus including the backlight apparatus according to the a preferred embodiment of the present invention.

As shown in FIG. 2, the liquid crystal display apparatus 10 preferably includes a bezel 11 having an opening portion thereof 11a, a liquid crystal display panel unit 12 having an edge portion thereof covered by the bezel 11, and a backlight apparatus 20 arranged at a rear side of the liquid crystal display panel unit 12.

The liquid crystal display panel unit 12 preferably includes a liquid crystal display panel 120, and a chassis 121 that is frame-shaped and arranged to hold the edge portion of the liquid crystal display panel 120. The liquid crystal display panel 120 preferably includes an AM substrate (active matrix substrate) 120a, and a counter substrate 120b arranged opposite the AM substrate 120a. And the liquid crystal display panel 120 is illuminated by the backlight apparatus 20, and thereby functions as a display panel. The liquid crystal display panel 120 here is an example of a "display panel" embodying the present invention.

The backlight apparatus 20, on a side of a front surface 21a of the chassis 21, is provided with a reflective sheet 22, a light source 23, a plurality of connector members 24 and 25 that are mounted at two end portions of the light source 23, respectively, cover members 27 and 28 covering each of the two end portions of the light source 23, and a plurality of optical sheets 29 and, on a side of a rear surface 21b of the chassis, is provided with an inverter substrate 30. In the following description, a longitudinal direction of the chassis 21 will be referred to as an A direction, and a transverse direction of the chassis 21 will be referred to as a B direction.

The chassis 21 is formed with a metal plate made of aluminum plate and the like. This chassis 21 has a pair of side portions formed by bending the metal plate perpendicularly or substantially perpendicularly toward a front side. Moreover, the chassis 21 has a plurality of through holes 21c formed at a predetermined interval in the B direction.

The reflective sheet 22 is formed of a sheet member capable of diffusing light, and is placed on the front surface 21a of the chassis 21. The sheet member forming this reflective sheet 22 is formed of, for example, PET (polyethylene tele-phthalate) resin or other suitable material.

The light source 23 is formed with a plurality of straight-tube type fluorescent tubes, and is arranged on the front side of the reflective sheet 22. That is, a plurality of light sources 23 have portions at a rear side thereof covered by the reflective sheet 22. Thus, a portion of the light emitted from the light sources 23 is diffused by the reflective sheet 22 so as to advance to the front side. Moreover, the plurality of light sources 23 are individually arranged to extend in the A direction, and are spaced apart from each other at a predetermined interval in the B direction. The light source 23 may be formed with a meandering fluorescent tube.

Moreover, the light sources, at the two end portions thereof, are each provided with a base portion 23a (see FIG. 3), and the base portion 23a is constructed with no wire harness connected thereto. The base portion 23a here is an example of a "terminal" embodying the present invention.

Figure 3:
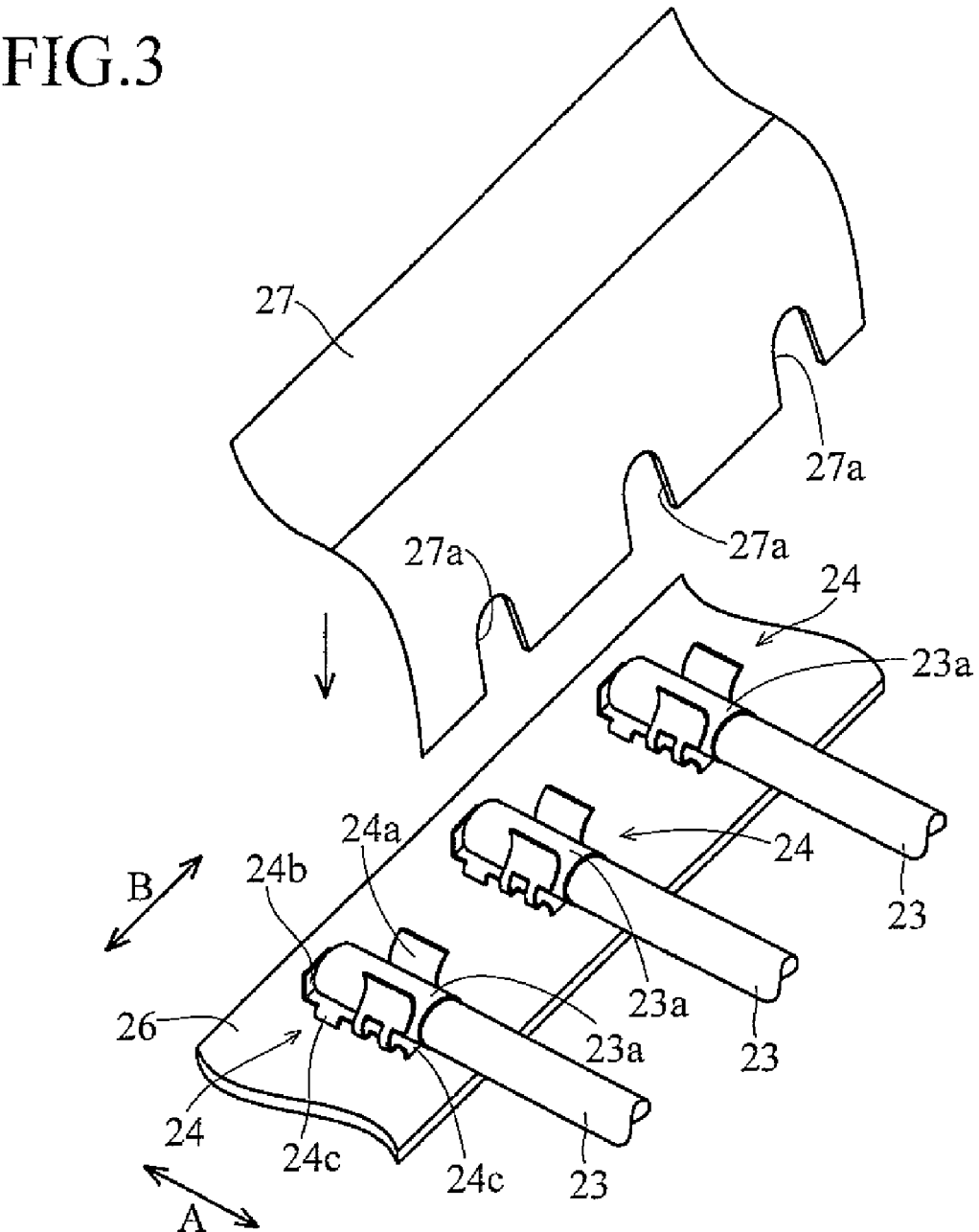
FIG. 3 is an exploded perspective view showing a structure of one end portions and their vicinity of light sources inside the backlight apparatus shown in FIG. 2.

In addition, as shown in FIG. 3, the light sources 23, at one end portions thereof, are each provided with a connector member 24 for holding and electrically connecting the light source 23.

The connector members 24 are each formed of a metal plate, and are connected to an unillustrated GND (ground). Moreover, the connector members 24 are fixedly mounted on the supporting substrate 26 in a state of being spaced apart from each other at a predetermined interval in the B direction. As shown in FIG. 2, this supporting substrate 26 is disposed outside the reflective sheet 22, and is fixed on the chassis 21.

Figure 7:
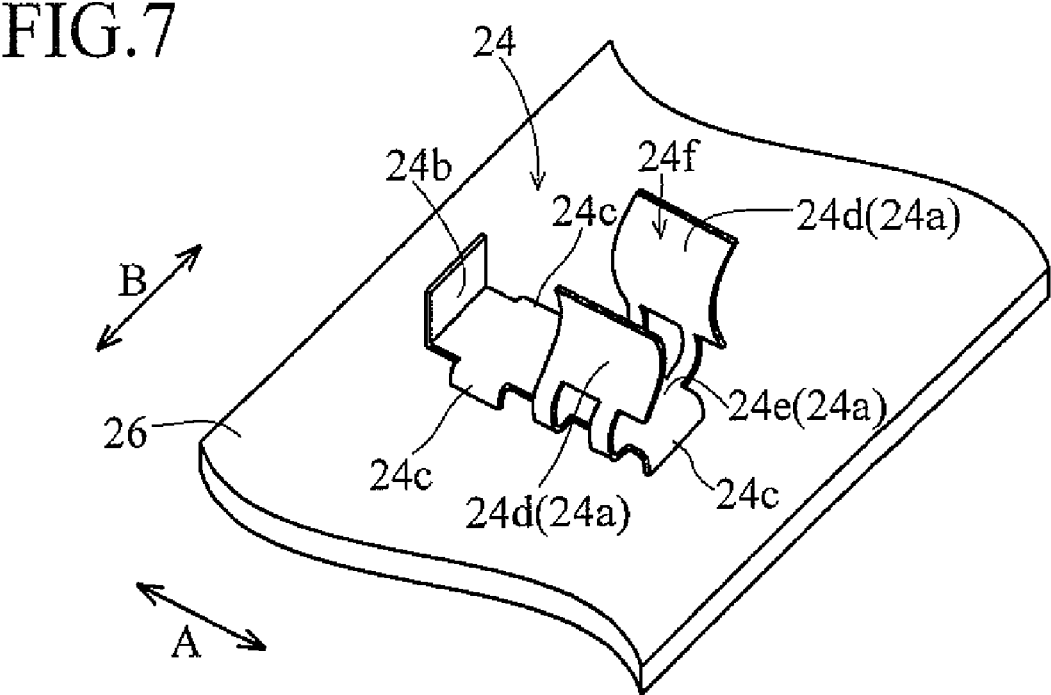
FIG. 7 is a perspective view showing a structure of a connector member fitted to the one end portion of the light source inside the backlight apparatus shown in FIG. 2.

Furthermore, as shown in FIGS. 3 and 7, the connector members 24 each preferably include a contact portion 24a thereof having a square shape or substantially square shape with one side open (U-shape) and electrically connected to the base portion 23a of the light source 23, a wall portion 24b thereof formed by being bent perpendicularly, and a supporting portion 24c thereof fixed on the supporting substrate 26. The square shape with one side open (U-shape) here is an example of a "recessed shape" embodying the present invention.

Figure 5:
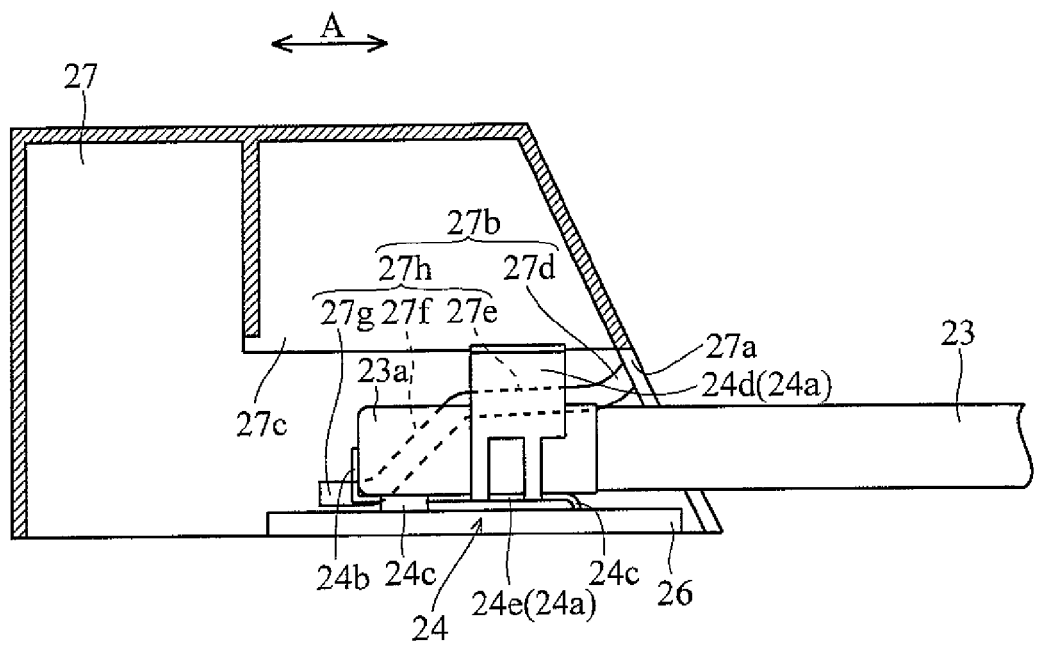
FIG. 5 is a sectional view showing the structure of the one end portion and its vicinity of the light source inside the backlight apparatus shown in FIG. 2.
Figure 6:
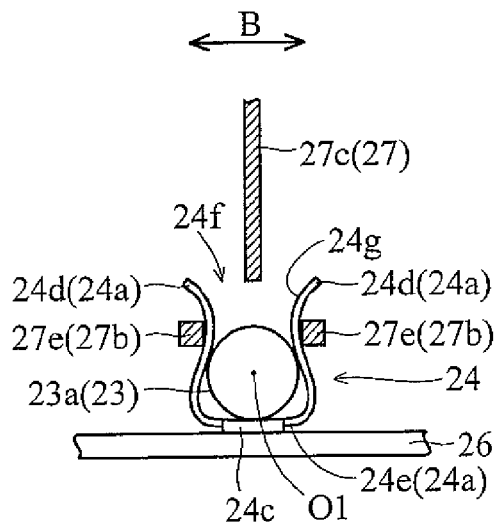
FIG. 6 is another sectional view showing the structure of the one end portion and its vicinity of the light source inside the backlight apparatus shown in FIG. 2.
Figure 8:
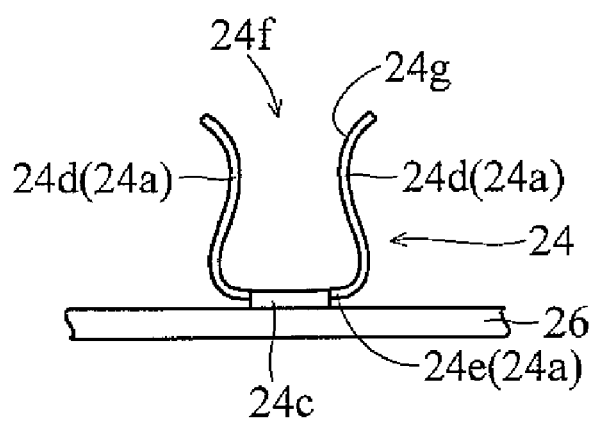
FIG. 8 is a front view showing the structure of the connector member fitted to the one end portion of the light source inside the backlight apparatus shown in FIG. 2.

In this preferred embodiment, as shown in FIGS. 7 and 8, the contact portion 24a formed in the square shape or substantially square shape with one side open (U-shape) has a pair of S-shaped side surface portions 24d thereof pinching the base portion 23a on one side of the light source 23 (see FIG. 3), and a coupling portion 24e thereof coupling the pair of side surface portions 24d. In the contact portion 24a, a recessed portion 24f in which the base portion 23a of the light source 23 is provided is defined by the pair of side surface portions 24d and the coupling portion 24e. As shown in FIGS. 5 and 6, with the base portion 23a of the light source 23 disposed inside the recessed portion 24f (see FIG. 6) of the contact portion 24a, the base portion 23a of the light source 23 is held by and electrically connected to the pair of side surface portions 24d and the coupling portion 24e.

As shown in FIG. 5, the wall portion 24b is arranged to prevent the light source 23 from moving outward in the A direction. Thus, it is possible to prevent the base portion 23a of the light source 23 from being not electrically connected to the side surface portions 24d of the contact portion 24a.

Figure 4:
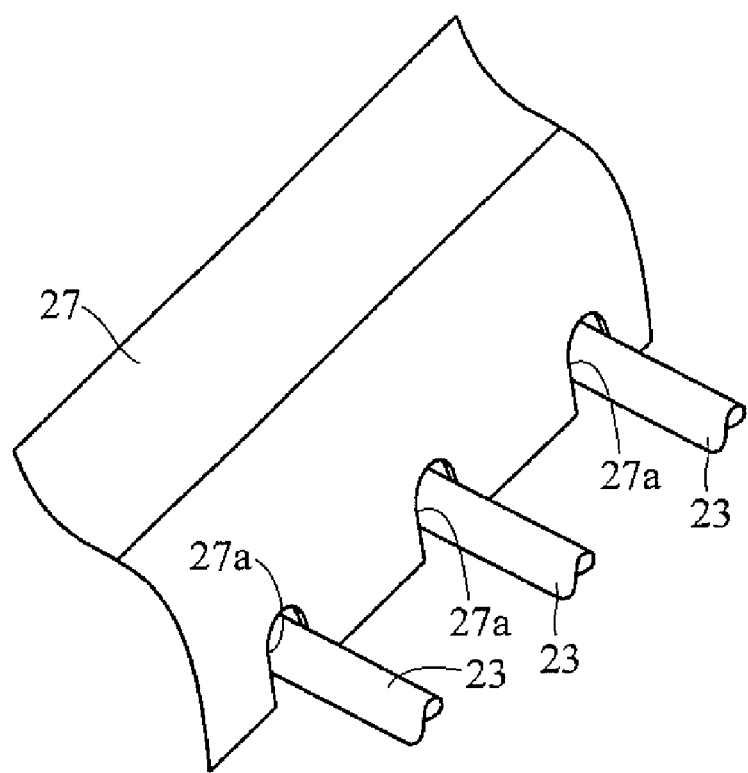
FIG. 4 is a perspective view showing the structure of the one end portions and their vicinity of the light sources inside the backlight apparatus shown in FIG. 2.

As shown in FIGS. 3 and 4, the cover member 27 is so arranged as to cover the connector members 24 and the supporting substrate 26 (see FIG. 3). This cover member 27 has a capability of preventing the one end portions of the light sources 23 from floating toward the front side (upward).

Figure 9:
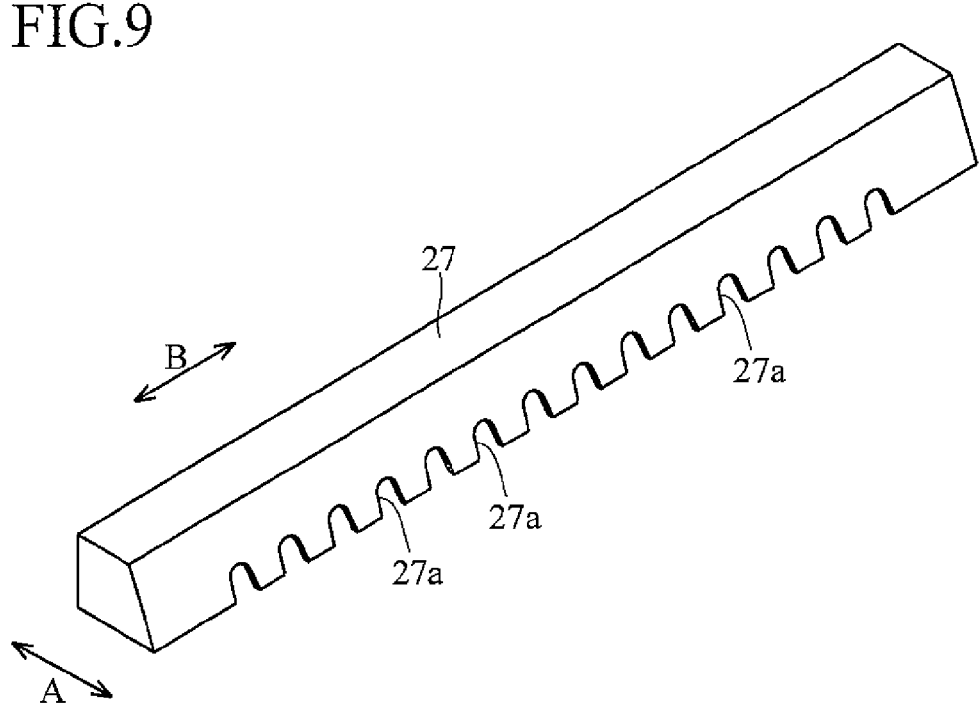
FIG. 9 is a perspective view showing a structure of a cover member placed on one side of the light sources inside the backlight apparatus shown in FIG. 2.

The cover member 27 is preferably formed out of resin or other suitable material. Moreover, as shown in FIG. 9, the cover member 27 has a plurality of insertion portions 27a arranged to be spaced apart from each other at a predetermined interval in the B direction. As shown in FIG. 4, these insertion portions 27a are arranged so that the light sources 23 on one side are inserted therein.

Figure 10:
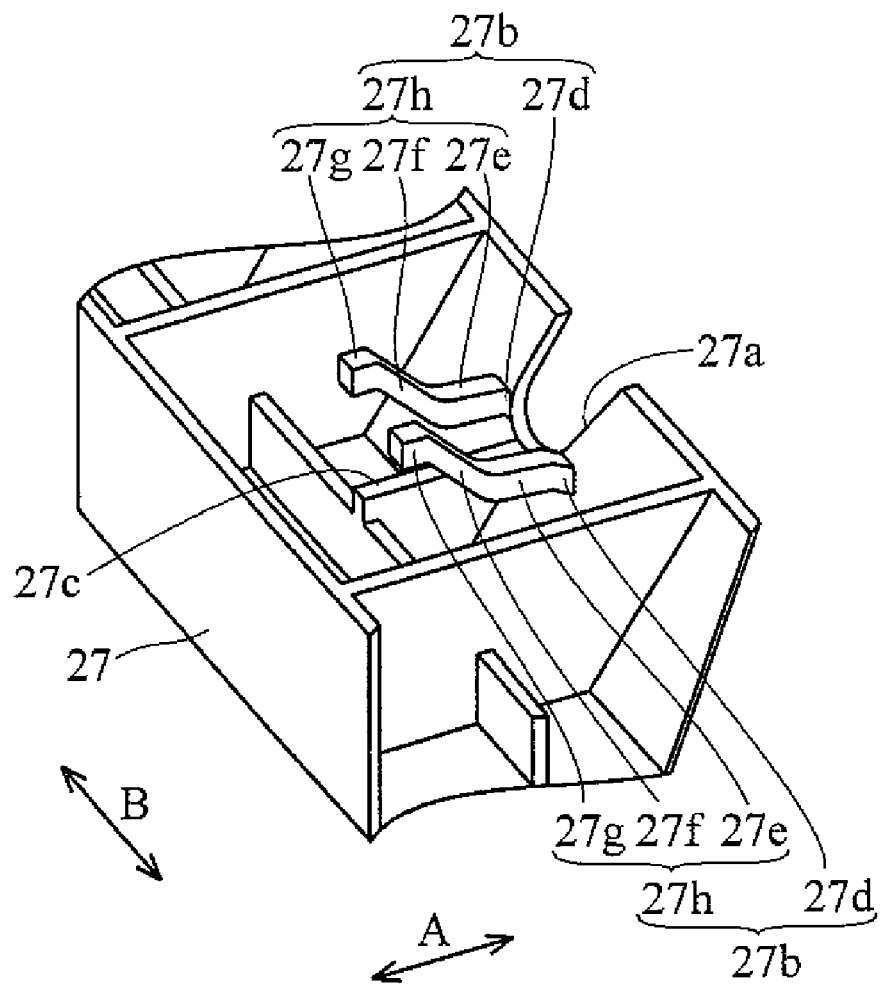
FIG. 10 is another perspective view showing the structure of the cover member placed on one side of the light sources inside the backlight apparatus shown in FIG. 2, as seen from a bottom side thereof.
Figure 11:
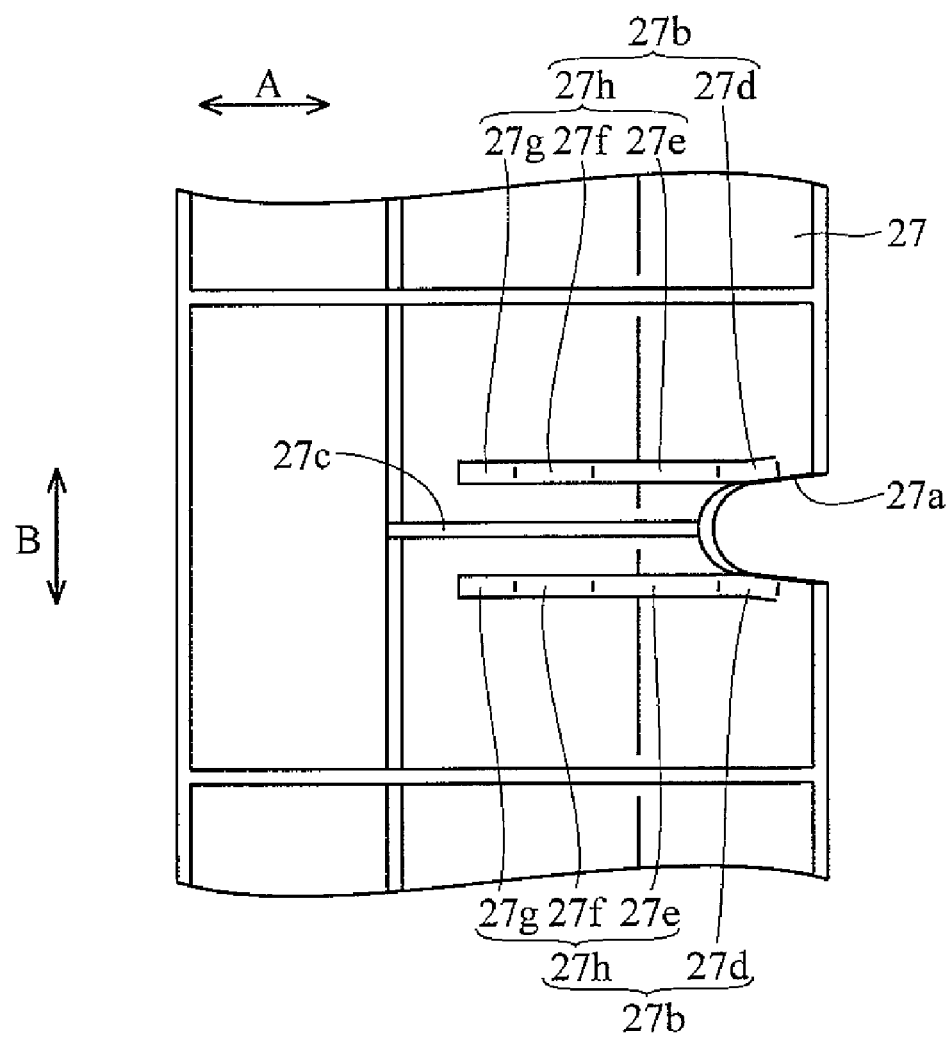
FIG. 11 is a bottom surface view showing the structure of the cover member placed on one side of the light sources inside the backlight apparatus shown in FIG. 2.
Figure 12:
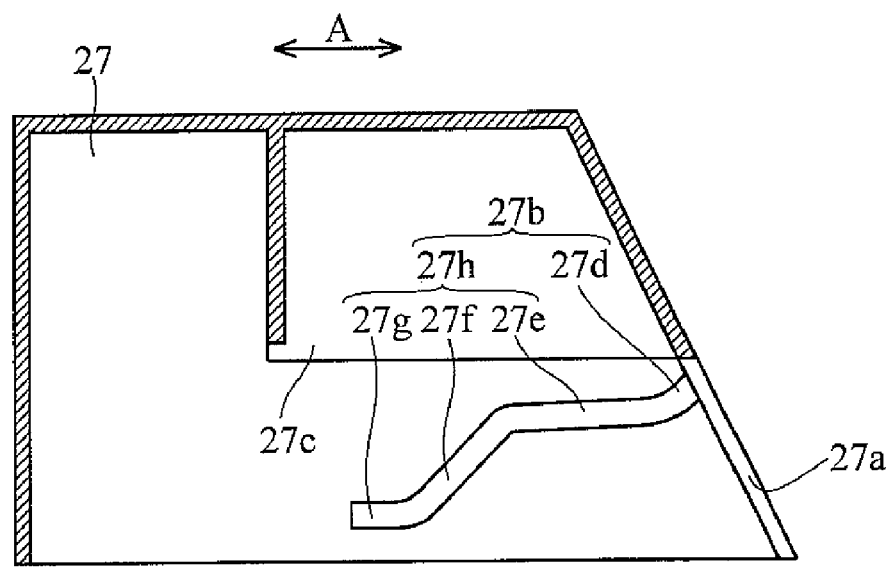
FIG. 12 is a sectional view showing the structure of the cover member placed on one side of the light source inside the backlight apparatus shown in FIG. 2.

In this preferred embodiment, as shown in FIGS. 10 to 12, the cover member 27 preferably is integral with pairs of contact correcting portions 27b provided on a side of the insertion portions 27a, and restriction portions 27c extending from the insertion portions 27a in the A direction. The contact correcting portion 27b here is an example of a "contact correcting member" embodying the present invention.

Moreover, in this preferred embodiment, as shown in FIGS. 5 and 6, the pair of contact correcting portions 27b are so arranged as to pinch the pair of side surface portions 24d of the contact portion 24a. As shown in FIGS. 10 and 11, the pair of contact correcting portions 27b are arranged so as to extend from the vicinity of the insertion portions 27a in the A direction. Furthermore, as shown in FIGS. 11 and 12, the pair of contact correcting portions 27b each have a root portion 27d thereof, a main abutting portion 27e thereof, a slanting portion 27f thereof, and a tip end portion 27g thereof in this order from a side of the insertion portion 27a. With the main abutting portions 27e, the slanting portions 27f, and the tip end portions 27g paired for each, a pair of pressing portions 27h are formed. As shown in FIG. 11, when seen in a plan view, the pair of contact correcting portions 27b are arranged such that the paired root portions 27d thereof are increasingly narrower toward a side of the tip end portions 27g, and the pair of pressing portions 27h (pair of main abutting portions 27e, pair of slanting portions 27f, and pair of tip end portions 27g) are arranged so as to be parallel or substantially parallel to each other.

Furthermore, in this preferred embodiment, as shown in FIG. 12, the root portion 27d is arranged so as to slant downward (toward the front side), heading toward the tip end portion 27g. The man abutting portion 27e is arranged so as to slant slightly downward toward the side of the tip end portion 27g, or to be horizontal (parallel or substantially parallel to the tip end portion 27g). The slanting portion 27f is arranged so as to slant downward, heading toward the tip end portion 27g, and the tip end portion 27g is arranged so as to be horizontal.

In addition, in this preferred embodiment, as shown in FIGS. 5 and 6, the pair of pressing portions 27h (contact correcting portions 27b) press the contact portion 24a toward the base portion 23a of the light source 23 so as to close the recessed portion 24f on a side of open ends 24g of the contact portion 24a. Specifically, with the pair of pressing portions 27h (contact correcting portions 27b), the main abutting portions 27e thereof are arranged to abut on the side surface portions 24d of the contact portion 24a, when the cover member 27 is in a state of being fitted to the chassis 21 (see FIG. 2). The pair of contact correcting portions 27b are preferably elastically deformable, and urge (press) the contact portion 24a toward the base portion 23a of the light source 23. Moreover, the main abutting portions 27e of the pressing portions 27h are arranged to abut on a portion of the side surface portions 24d, on the side of the open ends 24g (upward) relative to a center O1 of the light source 23, of the contact portions 24a.

The restriction portions 27c of the cover member 27 are arranged on the side of the open ends 24g (see FIG. 6) of the contact portions 24a (above the contact portions 24a). Thus, it is possible to prevent the light source 23 from moving toward the open ends 24g of the contact portion 24a, and hence to prevent the light source 23 from falling off from the contact portion 24a and from making no contact therewith.

As shown in FIG. 2, the other end portions of the light sources 23 are each provided with the connector members 25 for holding the light sources 23 and electrically connecting the light sources 23.

Figure 13:
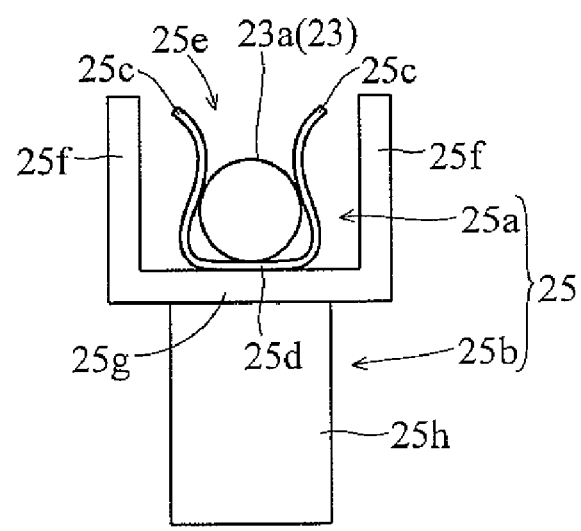
FIG. 13 is a front view showing the structure of the cover member placed on the other side of the light source inside the backlight apparatus shown in FIG. 2.

As shown in FIG. 13, a connector member 25 preferably includes a contact portion 25a formed of a metal plate having a square shape or substantially square shape with one side open (U-shape); and a pedestal portion 25b preferably formed of resin, for example. The contact portion 25a, likewise the aforementioned contact portion 24a, has a pair of S-shaped side surface portions 25c thereof pinching the base portion 23a on the other side of the light source 23, and a coupling portion 25d thereof coupling the pair of side surface portions 25c. Moreover, in the contact portion 25a, a recessed portion 25e in which the base portion 23a of the light source 23 is disposed is defined by the pair of side surface portion 25c and the coupling portion 25d.

The pedestal portion 25b has a pair of side surface portions 25f thereof arranged so as to pinch the side surface portions 25c of the contact portion 25a, a bottom surface portion 25g thereof provided between the pair of side surface portions 25f, and an inserting portion 25h thereof protruding downward from the bottom surface portion 25g. This pedestal portion 25b is fitted to the chassis 21 by inserting the inserting portion 25h into the through hole 21c (see FIG. 2) of the chassis 21. Moreover, the inserting portion 25h is electrically connected to the inverter substrate 30 (see FIG. 2) disposed on the rear surface 21b (see FIG. 2) of the chassis 21. This inverter substrate 30 has a capability of supplying power to the light sources 23 to thereby driving the light sources 23.

As shown in FIG. 2, the cover member 28 is arranged so as to cover the connector members 25. This cover member 28 is arranged to prevent the other end portions of the light sources 23 from floating toward the front side (upward). The cover member 28 here may have the same configuration as the aforementioned cover member 27, or may have a configuration with no contact correcting portion.

The optical sheets 29 are formed with a lens sheet, a diffusion sheet and the like, and is arranged at the front side of the light sources 23. By these optical sheets 29, light emitted from the light sources is converged and diffused.

Next, a procedure of fitting the light sources 23 and the cover member 27 to the connector members 24 of the backlight apparatus 20 according to a preferred embodiment of the present invention will be described with reference to FIGS. 5, 6, and 14 to 22.

Figure 14:
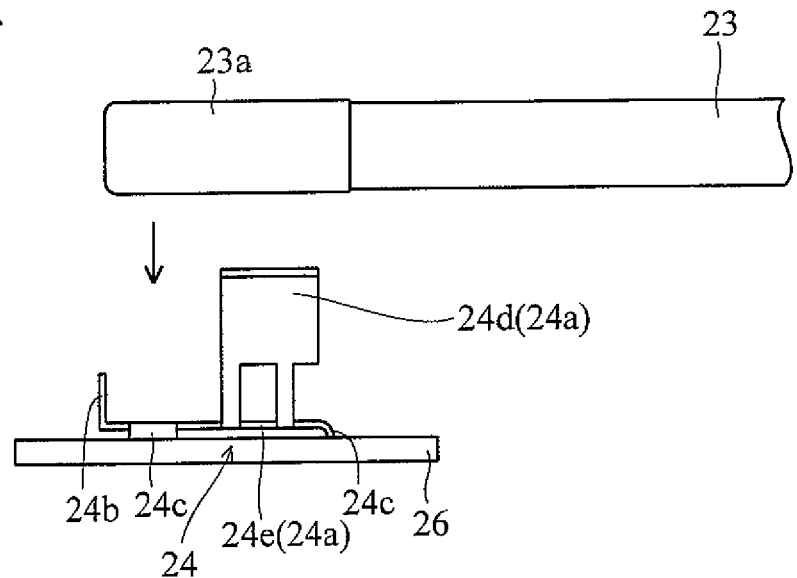
FIG. 14 is a side view for illustrating a procedure of fitting the light source and the cover member to the connector member inside the backlight apparatus shown in FIG. 2.
Figure 15:
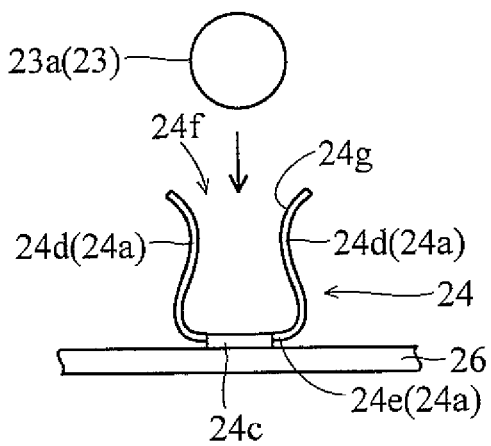
FIG. 15 is a front view for illustrating the procedure of fitting the light source and the cover member to the connector member inside the backlight apparatus shown in FIG. 2.
Figure 16:
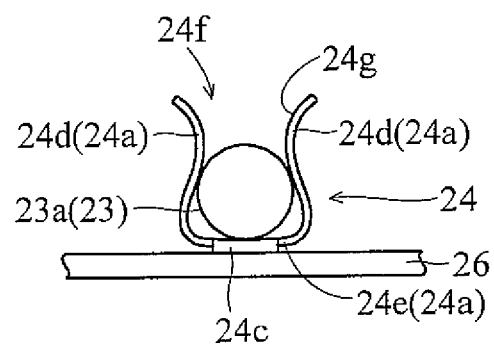
FIG. 16 is another front view for illustrating the procedure of fitting the light source and the cover member to the connector member inside the backlight apparatus shown in FIG. 2.
Figure 17:
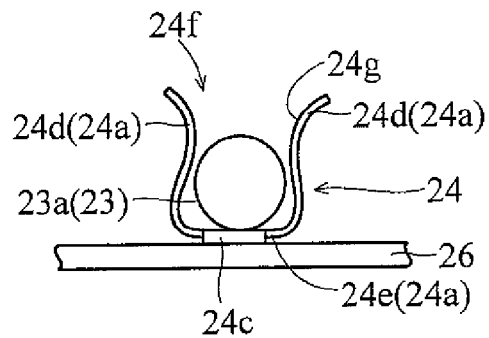
FIG. 17 is another front view for illustrating the procedure of fitting the light source and the cover member to the connector member inside the backlight apparatus shown in FIG. 2.

First, as shown in FIGS. 14 and 15, the light source 23 is inserted between the pair of side surface portions 24d from the side of the open ends 24g (see FIG. 15) of the contact portion 24a of the contact member 24 (above). Normally, as shown in FIG. 16, the light source 23 is then held by the pair of side surface portions 24d and the coupling portion 24e of the contact portion 24a. Thus, the base portion 23a of the light source 23 is arranged to abut on the pair of side surface portions 24d and the coupling portion 24e of the contact portion 24a, and to be in a state of being electrically conductive. On the other hand, as shown in FIG. 17, if the base portion 23a of the light source 23 is pressed against the pair of side surface portions 24d with an excessive force, or if an operator presses the side surface portions 24d with his or her finger, the side surface portions 24d may possibly be plastically deformed, and thus may remain opened wide outward. In this case, the base portion 23a of the light source 23 may fail to have contact with (abut on) the pair of side surface portions 24d and the coupling portion 24e, and thus may not be in the state of being electrically conductive. In the following description, a case where the side surface portions 24d of the contact portion 24a remains opened wide outward will be described.

Figure 18:
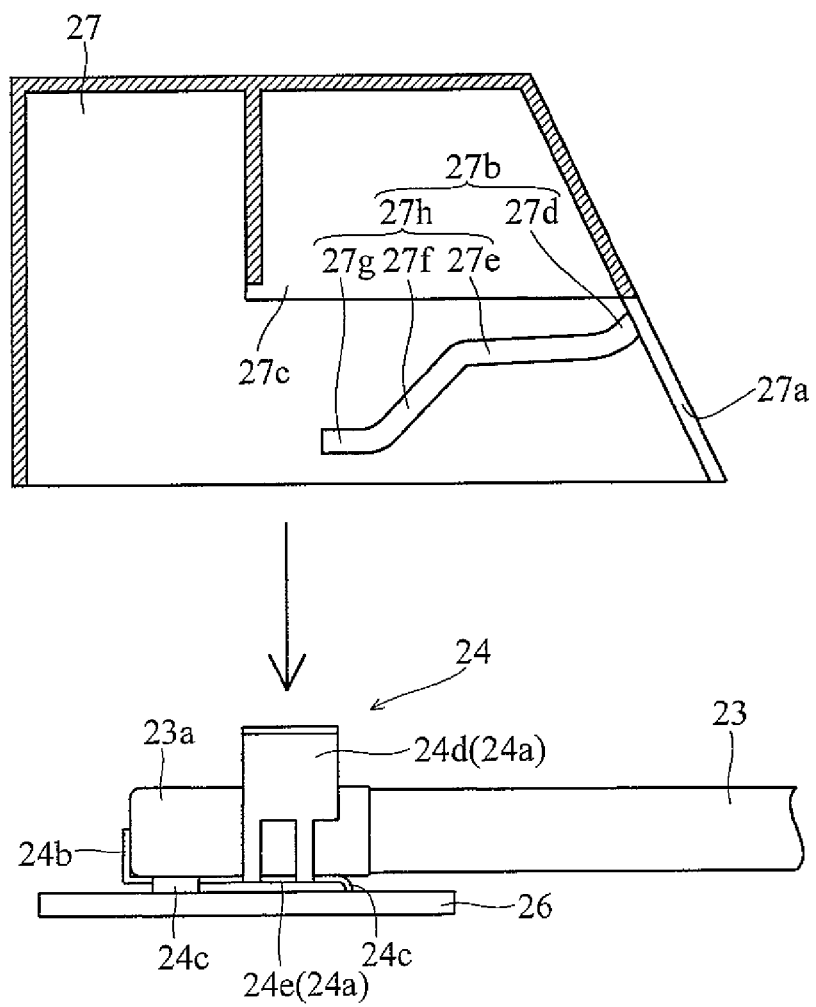
FIG. 18 is a sectional view for illustrating the procedure of fitting the light source and the cover member to the connector member inside the backlight apparatus shown in FIG. 2.
Figure 19:
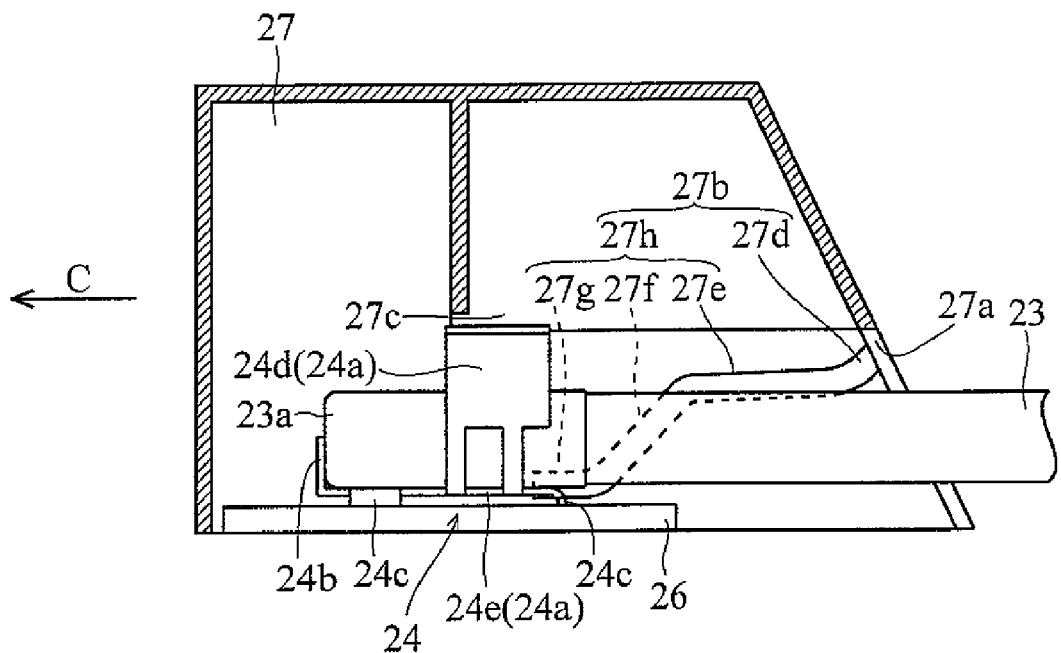
FIG. 19 is another sectional view for illustrating the procedure of fitting the light source and the cover to the connector member inside the backlight apparatus shown in FIG. 2.
Figure 20:
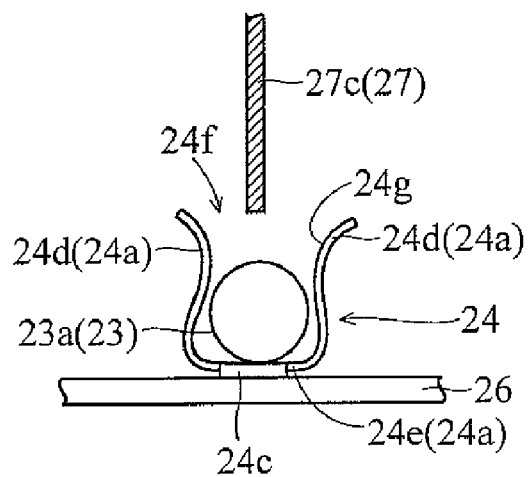
FIG. 20 is another front view for illustrating the procedure of fitting the light source and the cover member to the connector member inside the backlight apparatus shown in FIG. 2.
Figure 21:
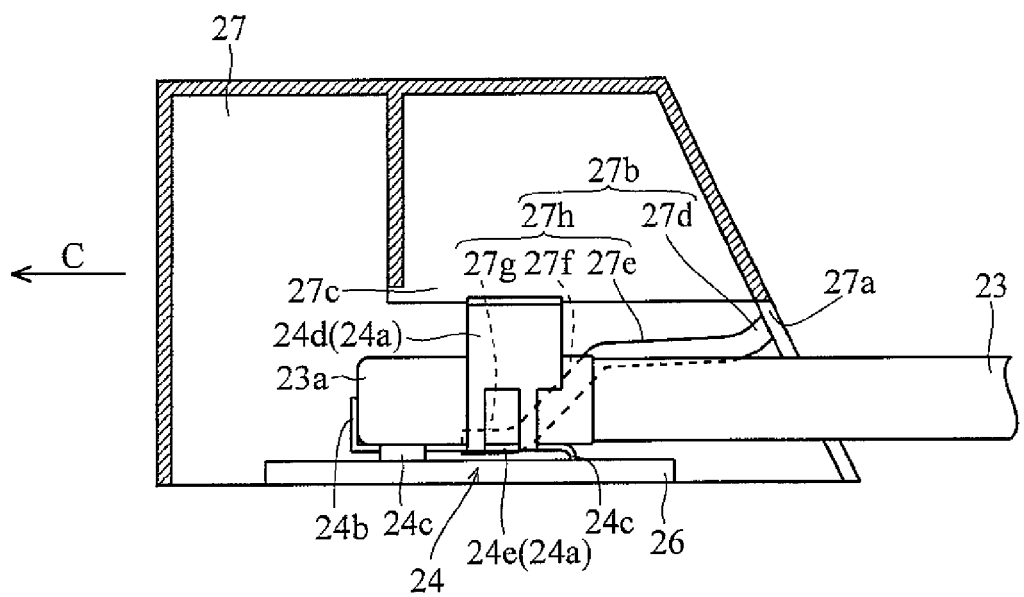
FIG. 21 is another sectional view for illustrating the procedure of fitting the light source and the cover member to the connector member inside the backlight apparatus shown in FIG. 2.
Figure 22:
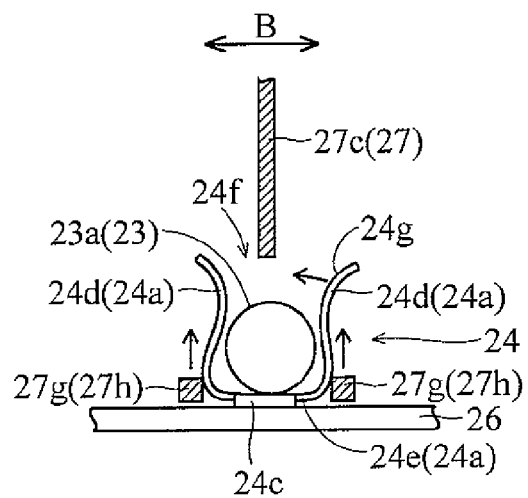
FIG. 22 is another front view for illustrating the procedure of fitting the light source and the cover member to the connector member inside the backlight apparatus shown in FIG. 2.

Next, as shown in FIG. 18, the cover member 27 is arranged so as to cover the connector members 24 from above (the front side). As a result, a state as shown in FIGS. 19 and 20 is obtained. Meanwhile, the restriction portions 27c of the cover member 27 are each arranged on the side of (above) the open ends 24g of the contact portion 24a.

Subsequently, by sliding the cover member 27 horizontally outward (in a C direction indicated by arrow (see FIG. 19)), the tip end portions 27g of the pair of pressing portions 27h (contact correcting portions 27b) are so positioned as to pinch the pair of side surface portions 24d of the contact portion 24a. Meanwhile, the tip end portions 27g of the pair of pressing portions 27h are arranged to abut on lower portions of the pair of side surface portions 24d, and to be in a state of being opened slightly wide in the B direction. Thus, the tip end portions 27g of the pair of pressing portions 27h are in a state of urging (pressing) the lower portions of the pair of side surface portions 24d inward (toward the light source 23).

After that, by sliding the cover member 27 horizontally further outward (in the C direction (see FIG. 21)), a position at which the pressing portions 27h abut on (press) the side surface portions 24d is moved to a side of the open ends 24g of the contact portion 24a (upward). That is, the contact portion 24a is changed from a state of making contact with (pressed by) the tip end portions 27g of the pressing portions 27h to a state of making contact with (pressed by) the slanting portions 27f, and then to a state of making contact with (pressed by) the main abutting portions 27e (state shown in FIGS. 5 and 6). Meanwhile, in this preferred embodiment, thanks to the pair of pressing portions 27h, the side surface portions 24d of the contact portion 24a is changed from the state of being opened wide outward to a state of making contact with (pressed by) the base portion 23a of the light source 23.

As shown in FIGS. 5 and 6, when the contact portion 24a is in the state of making contact with (pressed by) the main abutting portions 27e, the main abutting portions 27e of the pair of pressing portions 27h abut on the pair of side surface portions 24d on the side of the open ends 24g relative to the center O1 (see FIG. 6) of the light source 23. Thus, the main abutting portions 27e of the pair of pressing portions 27h are in a state of urging (pressing) the portion of the pair of side surface portions 24d on the side of the open ends 24g inward (toward the light source 23). In this preferred embodiment, the main abutting portions 27e are arranged so as to slant slightly downward, heading toward the tip end portions 27g, or to be horizontal. Thus, it is possible to prevent a position in height at which the pressing portions 27h (main abutting portions 27e) abut on the side surface portions 24d from varying according to a distance at which the cover member 27 is made to slide.

In this way, the light sources 23 and the cover member 27 are fitted to the connector members 24 inside the backlight apparatus 20.

In this preferred embodiment, as described above, the contact correcting portions 27b are arranged so as to press the contact portion 24a of the contact member 24 toward the base portion 23a of the light source 23 so as to close the recessed portion 24f on the side of the open ends 24g of the contact portion 24a. With this configuration, even in a case where, when the light source 23 is fitted to the connector member 24, the base portion 23a of the light source 23 is pressed against the contact portion 24a with an excessive force or an operator presses the contact portion 24a with his or her finger, causing the contact portion 24a to be plastically deformed and to remain opened wide outward accordingly, it is possible to press the contact portion 24a of the contact member 24 toward the base portion 23a of the light source 23 so as to close the recessed portion 24f on the side of the open ends 24g of the contact portion 24a. Thus, it is possible to prevent the base portion 23a of the light source 23 and the contact portion 24a of the connector member 24 from being in a state of having no contact with each other. Thus, it is possible to avoid a situation where the light sources 23 cannot be turned on.

Moreover, in this preferred embodiment, the contact correcting portions 27b are each provided with the pair of pressing portions 27h so as to pinch the pair of side surface portions 24d of the contact portion 24, making it possible to press the pair of side surface portions 24d of the contact portion 24a toward the base portion 23a of the light source 23 placed inside the recessed portion 24f of the contact portion 24a. Thus, it is possible to easily prevent the base portion 23a of the light source 23 and the contact portion 23a of the connector member 24 from being in the state of having no contact with each other.

Moreover, in this preferred embodiment, the contact correcting portions 27b are configured such that a position at which the pair of pressing portions 27h make contact with the pair of side surface portions 24d is moved from the side of the coupling portion 24e of the contact portion 24a toward the side of the open ends 24g of the contact portion, and that thereby the contact portion 24a of the connector member 24 is pressed toward the base portion 23a of the light source 23. With this configuration, by moving the position at which the pair of pressing portions 27h make contact with the pair of side surface portions 24d from the side of the coupling portion 24e of the contact portion 24e toward the side of the open ends 24g of the contact portion 24e, it is possible to easily press the contact portion 24a of the connector member 24 toward the base portion 23a of the light source 23. Thus, it is possible to prevent the base portion 23a of the light source 23 and the contact portion 24a of the connector member 24 from being in the state of having no contact with each other.

Moreover, in this preferred embodiment, the pair of pressing portions 27h are each provided with a slanting portion 27f thereof slanting downward toward the tip end portions 27g (toward the rear side). Thus, by moving the pair of pressing portions 27h in the direction (C direction indicated by arrow) in which the light source 23 extends, it is possible to easily move the position at which the pair of pressing portion 27h (slanting portions 27f) make contact with the pair of side surface portions 24d from the side of the coupling portion 24e of the contact portion 24a to the side of the open ends 24g. of the contact portion 24a Moreover, in this preferred embodiment, the main abutting portions 27e of the contact correcting portion 27b are arranged to abut on a portion on the side of the open ends 24g of the contact portion 24a relative to the center O1 of the light source 23. Thus, it is possible to easily press the contact portion 24a of the connector member 24 toward the base portion 23a of the light source 23 so as to close the recessed portion 24f on the side of the open ends 24g of the contact portion 24a.

Moreover, in this preferred embodiment, the contact correcting portions 27b are preferably elastically deformable, and urge the contact portion 24a of the connector member 24 toward the base portion 23a of the light source 23. With this configuration, it is possible to easily press (urge) the contact portion 24a of the connector 24 toward the base portion 23a of the light source 23, with the contact correcting portions 27b.

It should be understood that the preferred embodiments disclosed herein are illustrative only, and are not meant to limit the scope of the present invention. The scope of the present invention is defined not by the preferred embodiments described above but by the appended claims, and encompasses any changes within the meanings and scope equivalent to the claims.

For example, although the above-described preferred embodiments deal with an example in which the display panel, the display apparatus, and the television receiver embodying the present invention are applied to the liquid crystal display panel, the liquid crystal display apparatus, and the liquid crystal television receiver, respectively, the present invention is not limited to them, and may be applied to any display panel, any display apparatus, and any television receiver other than the liquid crystal display panel, the liquid crystal display apparatus, and the liquid crystal television receiver.

Moreover, although the above-described preferred embodiments deal with an example in which the connector member fitted to the other end portion of the light source having a different shape from the connector member fitted to the one end portion of the light source, the present invention is not limited to this, and the connector fitted to the other end portion of the light source may be formed in the same shape as the connector member fitted to the one end portion of the light source.

Moreover, although the above-described preferred embodiments deal with an example in which the contact correcting portions are provided integrally with the cover member, the present invention is not limited to this, and the contact correcting portions may be provided separately from the cover member.

Moreover, although the above-described preferred embodiments deal with an example in which the tip end portions of the pair of the pressing portions are arranged so as to be parallel or substantially parallel, the present invention is not limited to this, and the tip end portions of the pair of pressing portions may be, for example, formed so as to be opened wide toward the tip ends. In this case, the pair of pressing portions make it possible to easily pinch the pair of side surface portions of the contact portion.

Figure 23:
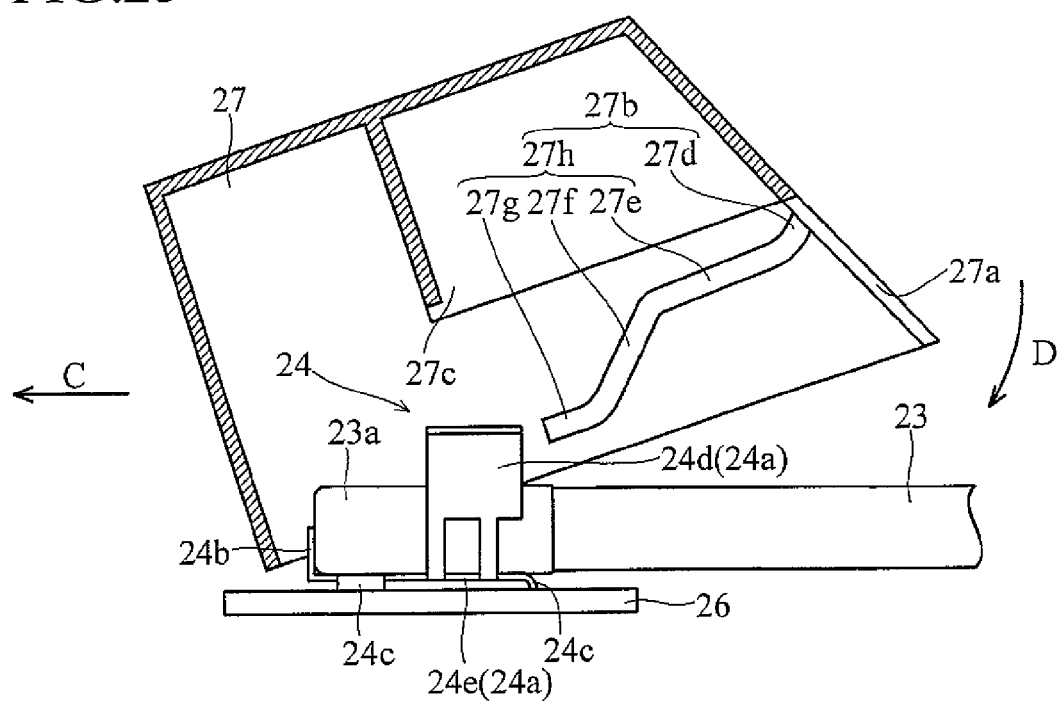
FIG. 23 is a sectional view for illustrating a modified example of the procedure of fitting the light source and the cover member to the connector member inside the backlight apparatus according to a preferred embodiment of the present invention.

Moreover, although the above-described preferred embodiments deal with an example in which when the cover member is fitted to the connector members, the cover member is arranged so as to cover the connector members, and is then made to slide horizontally in the outward direction (C direction), the present invention is not limited to this, and as in the modified example of the preferred embodiment shown in FIG. 23, the cover member may be fitted to the connector members by being rotated in the D direction indicated by arrow and made to slide in the outward direction (C direction indicated by arrow).

Moreover, although the above-described preferred embodiments deal with an example in which the main abutting portions of the pressing portions are arranged to abut on the portion on the side of the open ends of the contact portion relative to the center of the light source, the present invention is not limited to this, and the main abutting portions of the pressing portions may be made to abut on a portion on the side of the coupling portion of the contact portion relative to the center of the light source.

Moreover, although the above-described preferred embodiments deal with an example in which the light source is composed of a fluorescent tube, the present invention is not limited to this, and the light source may be composed of an electrical discharge tube, an LED or the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight apparatus comprising:
a light source including a terminal;
a connector member including a recessed shape contact portion electrically connected to the terminal of the light source; and
a contact correcting member arranged to contact with the contact portion of the connector member; wherein
the light source is arranged inside a recessed portion, having the recessed shape, of the contact member;
the contact correcting member is arranged to press the contact portion of the contact member toward the terminal of the light source so as to close the recessed portion on a side of open ends of the contact portion;
the contact portion includes a pair of side surface portions thereof arranged to pinch the terminal of the light source and a coupling portion arranged to couple the pair of side surface portions, and the contact correcting member includes a pair of pressing portions arranged to pinch the pair of side surface portions of the contact portion; and
the contact correcting member is arranged such that a position at which the pair of pressing portions make contact with the pair of side surface portions is moved from a side of the coupling portion of the contact portion to a side of the open ends of the contact portion, and such that the contact portion of the contact member is pressed toward the terminal of the light source.

2. The backlight apparatus according to claim 1, wherein the pair of pressing portions each includes a slanting portion thereof slanting in a direction in which the light source extends.

3. The backlight apparatus according to claim 1, wherein the contact correcting member is arranged to be brought into contact with a portion on the side of the open ends of the contact portion relative to a center of the light source.

4. The backlight apparatus according to claim 1, wherein the contact correcting member is elastically deformable and is arranged to urge the contact portion of the connector member toward the terminal of the light source.

5. A display apparatus comprising the backlight apparatus according to claim 1, and a display panel illuminated by the backlight apparatus.

6. A television receiver comprising:
the display apparatus according to claim 5;
a cabinet accommodating the display apparatus;
a tuner; and
a loudspeaker.

* * * * *